Feb. 21, 1939.   A. B. EASTWOOD   2,148,369
CUT-OFF MACHINE
Filed March 6, 1937   2 Sheets-Sheet 1

WITNESS:

INVENTOR
Abraham B. Eastwood
BY Augustus B. Stoughton
ATTORNEY.

Feb. 21, 1939.  A. B. EASTWOOD  2,148,369
CUT-OFF MACHINE
Filed March 6, 1937   2 Sheets-Sheet 2
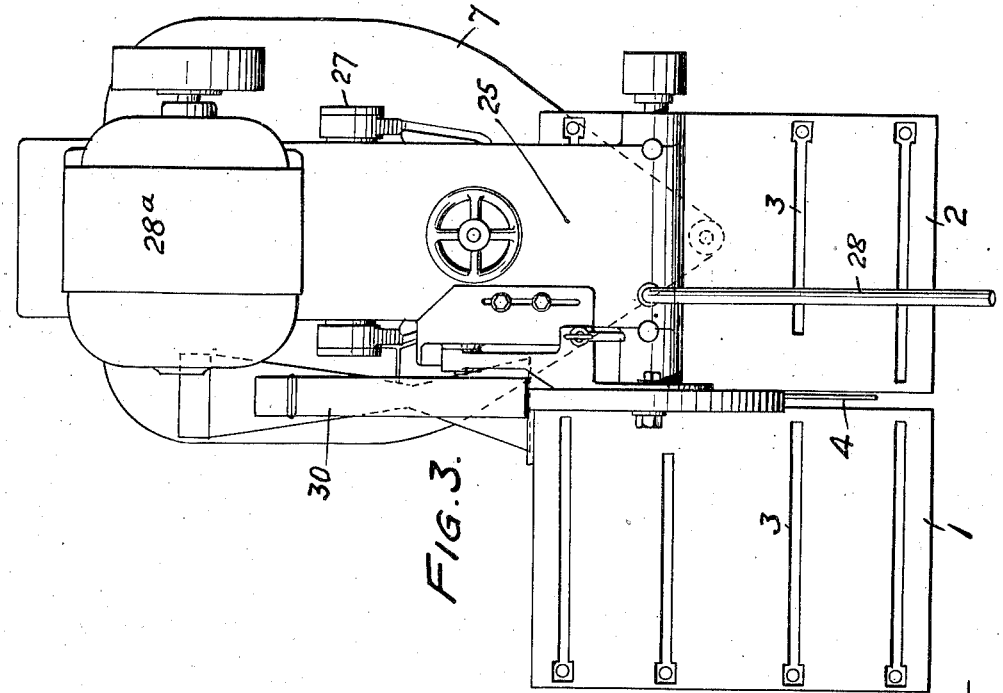
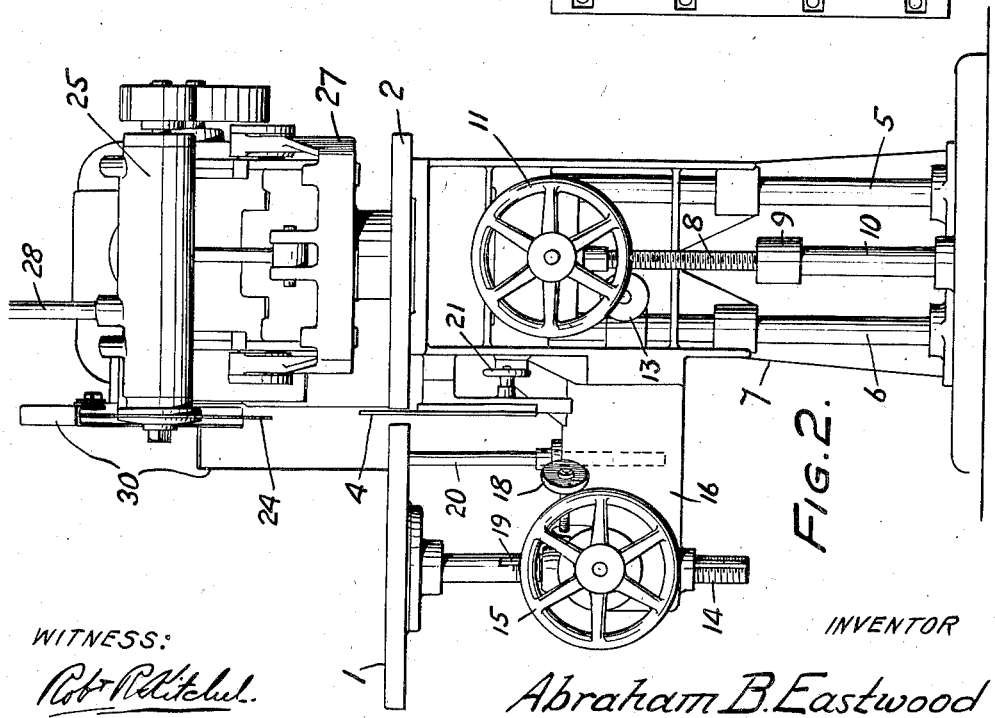
WITNESS:
INVENTOR
Abraham B. Eastwood
BY
Augustus B. Stoughton,
ATTORNEY.

Patented Feb. 21, 1939

2,148,369

UNITED STATES PATENT OFFICE 2,148,369

CUT-OFF MACHINE

Abraham B. Eastwood, Abington, Pa., assignor to The Tabor Manufacturing Company, Philadelphia, Pa., a corporation of Pennsylvania Application March 6, 1937, Serial No. 129,333

4 Claims. (Cl. 51—98)

The principal object of the present invention is to adapt an abrasive or other cut-off machine of the traveling head, or fixed head, or chopping or rocker head type to cut off shaped castings and to other material to be cut, such as gates or risers on castings, in such a way that the cuts are so clean and close to the body of the casting that snagging and finish grinding are eliminated or reduced, and with such rapidity that castings do not accumulate from day to day in the cleaning room, making to-day's cast to-day's billing, and with such rapidity that an investment in metal, more especially in expensive alloys, is not tied up in heavy gates and risers, and with such rapidity that labor cost is reduced and the products of a foundry are kept moving along between pouring and shipping.

Other objects of the invention will appear from the following description at the end of which the invention will be claimed.

To these and other ends hereinafter stated or appearing the invention in cut-off machines, generally stated, consists in a table, T-slotted or not and built in two sections either of which can be quickly set at appropriate level as by handwheel adjustment to adapt the table to odd shaped castings and other material to be cut; with or without a support gate adjustably secured to one side section for supporting a part of the casting or other work.

The invention also comprises the improvements to be presently described and finally claimed.

In the following description reference will be made to the accompanying drawings forming part hereof and in which:

Figure 2 is an end view looking from left to right in Fig. 1, and

Figure 3 is a top or plan view.

Figure 1:
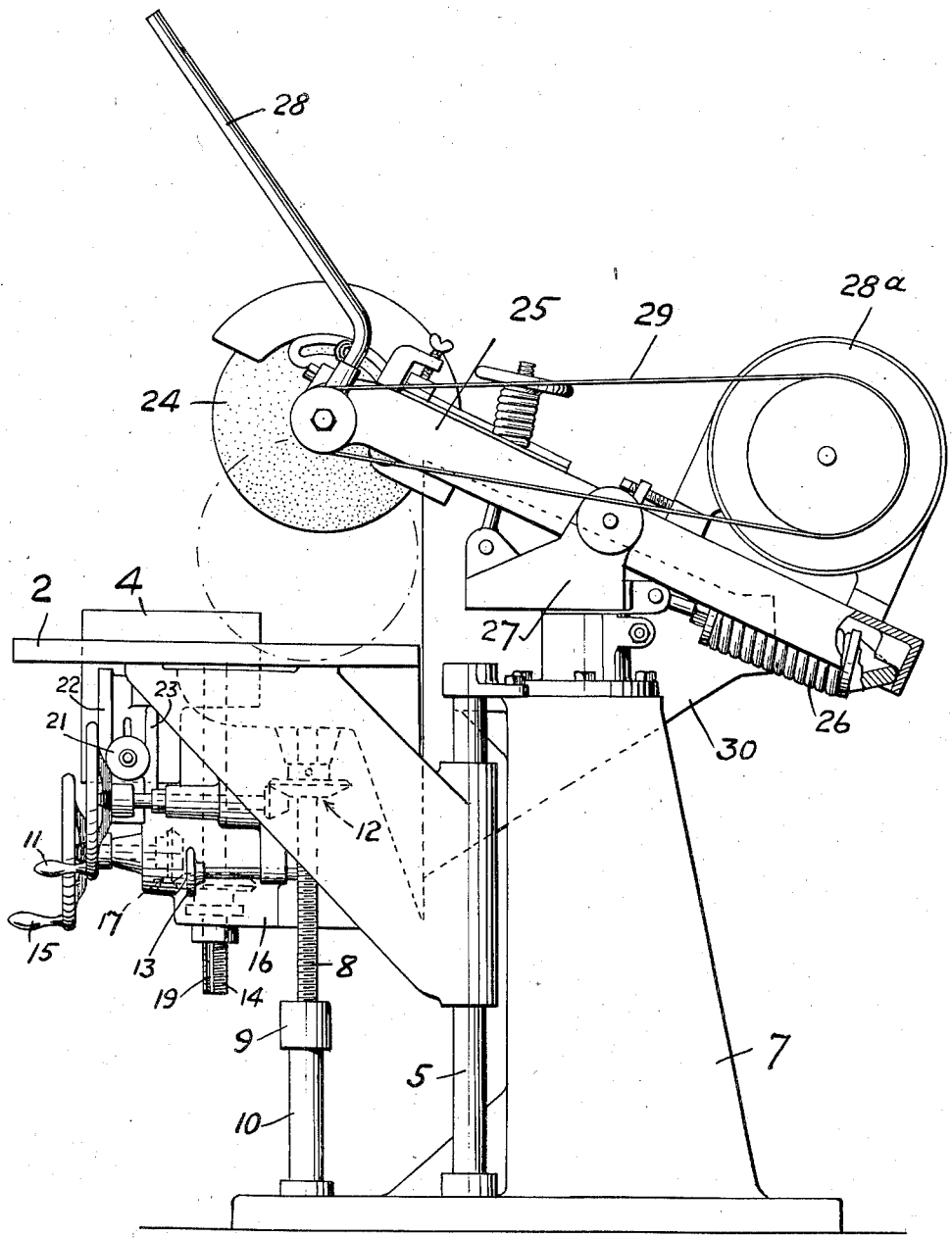
Figure 1 is a side elevational view of a cutting machine equipped with a split table and embodying features of the invention.

Referring to the drawings 1 and 2 indicate the two side sections of the table which may be described as split and which may be T-slotted as at 3 or not as preferred. Either of the two side sections 1 and 2 may be quickly set at appropriate levels to adapt the table to odd shaped castings or other material to be cut. 4 is a support gate which when provided is adjustably secured to one side section of the table and it is useful for supporting a part of a casting, such for example, as a gate or riser. By these means the machine, or more accurately the table, may be quickly and accurately adjusted to support odd shaped castings for cutting without the use of blocks, stands and like equipment. The table section 2 is mounted to slide up and down on a pair of posts 5 and 6 rising from the base of the standard 7. The screw 8 is rotatable in a nut 9 carried by a column 10 rising from the base of the machine and this screw serves to raise and to lower the table 2. There is a hand wheel 11 which is geared to the screw 8 as indicated by dotted lines at 12 in Fig. 1, so that as the hand wheel is turned in one direction or the other the screw is rotated in the nut 9 and the screw raises or lowers the table section 2. 13 is a hand clamp which serves to hold the table section 2 at any elevation or level to which it may be adjusted. The table section 1 is raised and lowered by a screw 14 which does not rotate but which is engaged by a nut rotated by the hand wheel 15, the nut is carried in an extension or bracket 16 extending from the table section 2, the nut and means for rotating it are indicated at 17 in Fig. 1. 18 is a hand screw clamp which enters a notch 19 in the screw and clamps the table section 1 in adjusted position. 20 is a post connected with table 1 and movable endwise in the bracket 16 and its purpose is to guide the table section 1. The supporting gate 4 is adjustable up and down on the table section 2 by means of the bolt and slot connection 21 and it is guided between ways or guides 22 and 23, Fig. 1, so that it can be adjusted at any height required above the table section 2 or dropped into inoperative position. The table sections 1 and 2 are spaced apart as shown in Fig. 2, and the space thus provided accommodates the support gate 4 when present and also the cutter 24. As shown the cutter 24 is mounted at the end of an arm 25 counterbalanced by a compression spring 26 and pivoted on a turret 27 mounted on the standard 7. By means of the handle 28 the cutter 24 may be brought into operative position as indicated by dotted lines in Fig. 1. The cutter 24 is driven from a motor 28ª mounted on the arm 25 thru the intervention of a belt 29. The cutter 24 therefore is of the chopper type and while certain adjustments appear on the drawings they are not parts of the invention and among them are shown dust collectors 30.

It will be obvious to those skilled in the art to which the invention relates that modifications may be made in details of construction and arrangement without departing from the spirit of the invention which is not limited as to such matters or otherwise than the prior art and the appended claims may require.

I claim:

1. In a cut-off machine the combination of a split table having the table sections spaced apart, a rotary cutter mounted on a horizontal axis for operation in respect to the space between the table sections, a support arranged in the space between the table sections and near the cutter and manual means for adjusting each of the table sections and support at different levels with a rectilinear motion.

2. In a cut-off machine table sections of which one is provided with a lateral support for the other and screw means interposed between one of the tables and the support and between the other table and the ground.

3. A cut-off machine comprising, in combination, a standard and a base, a split table having the sections thereof spaced apart, a cutter mechanism mounted on the standard and including a cutter accommodated by said space, and guide and elevator mechanisms interposed respectively between the base and one table section and between the two table sections.

4. A cut-off machine comprising, in combination, a table in two sections spaced apart, a cutter accommodated by said space, guide posts for the respective table sections and of which one is interposed between the two table sections, nut and screw mechanisms for respectively raising and lowering the table sections and of which one is interposed between the two table sections, handwheel mechanisms for respectively operating the screw and nut mechanisms, and hand operatable clamps for each of the tables.

ABRAHAM B. EASTWOOD.